P. EWALD.
PLOW.
APPLICATION FILED AUG. 10, 1911.
1,167,683.
Patented Jan. 11, 1916.
4 SHEETS—SHEET 1.
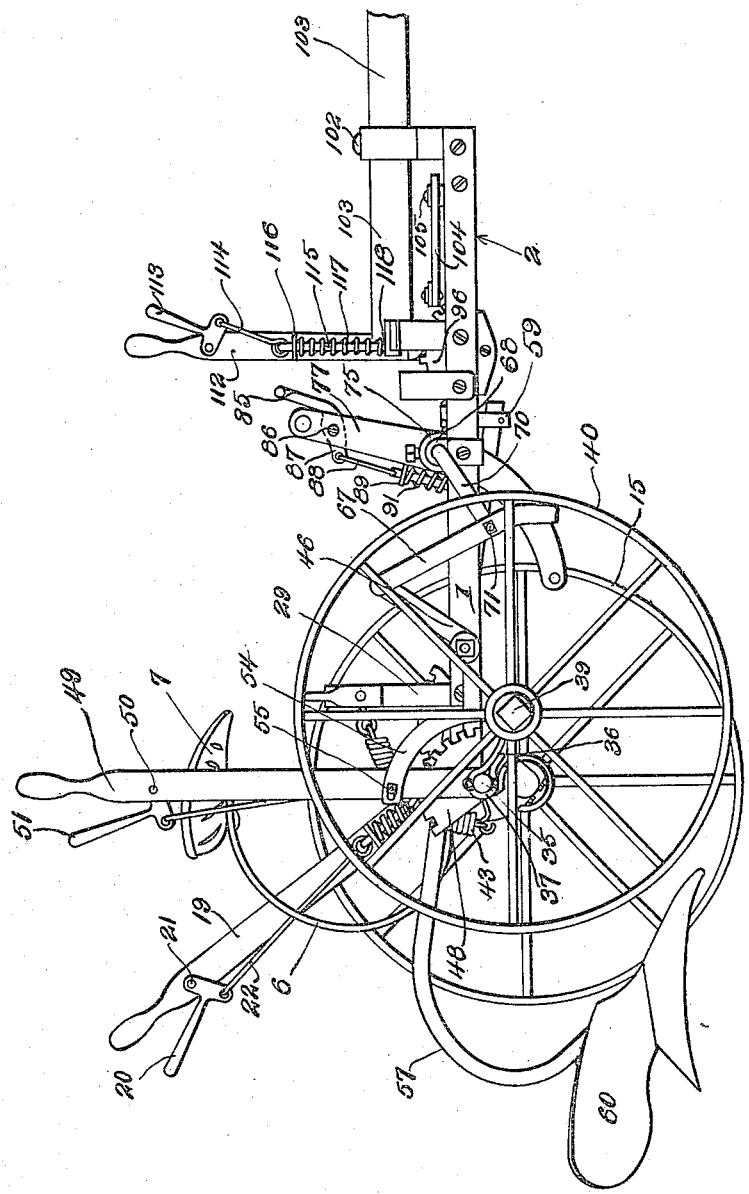
Witnesses
Inventor
Paul Ewald.
By Wm. E. Richardson
Attorney

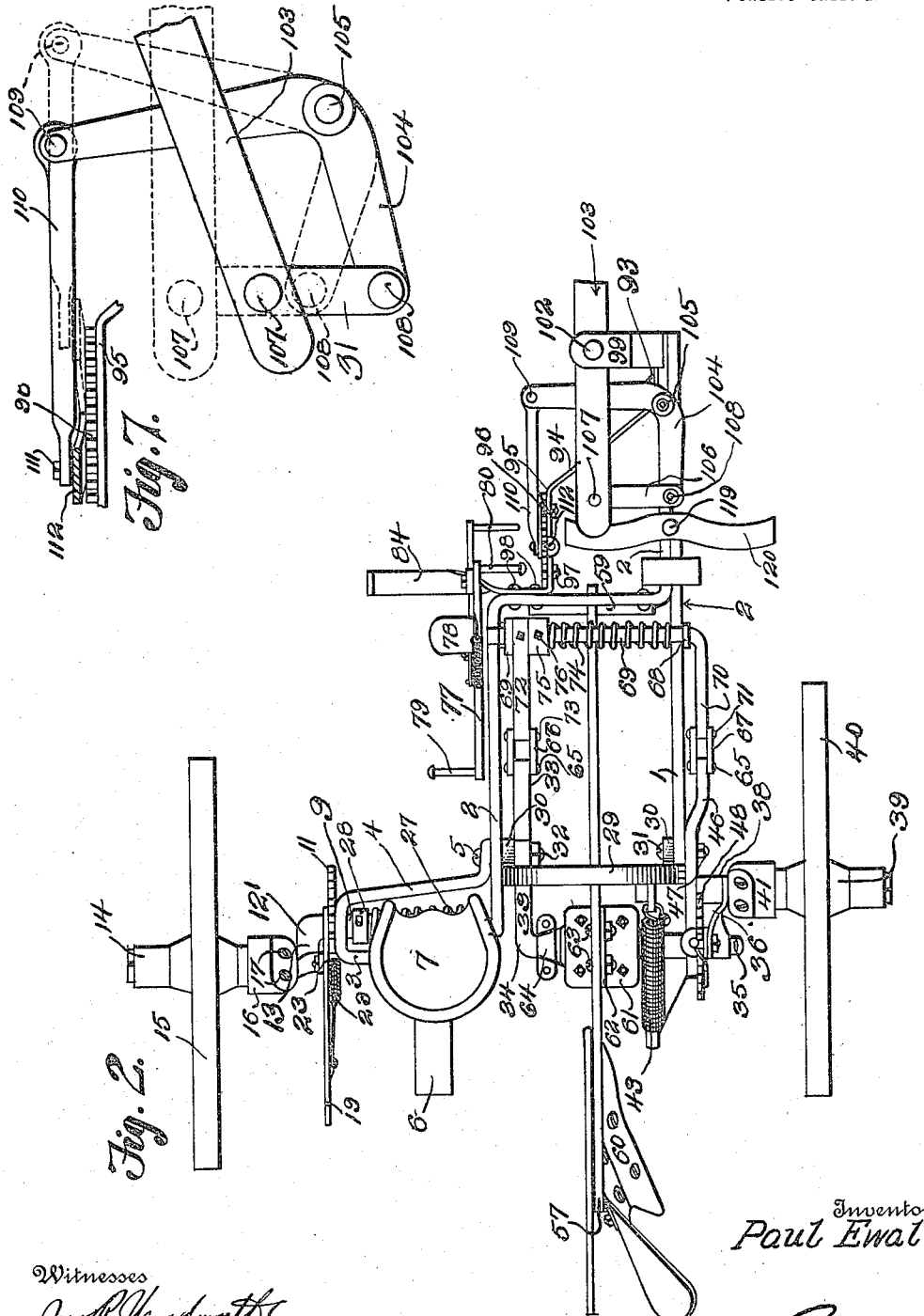

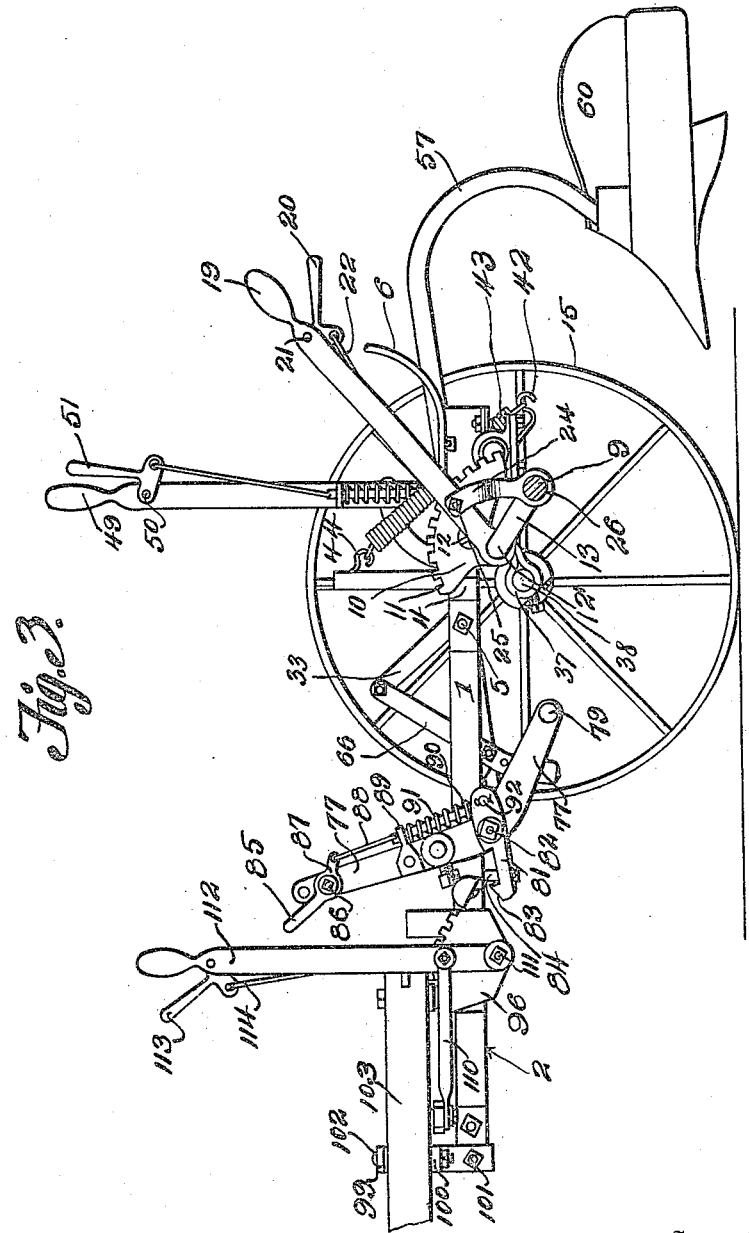

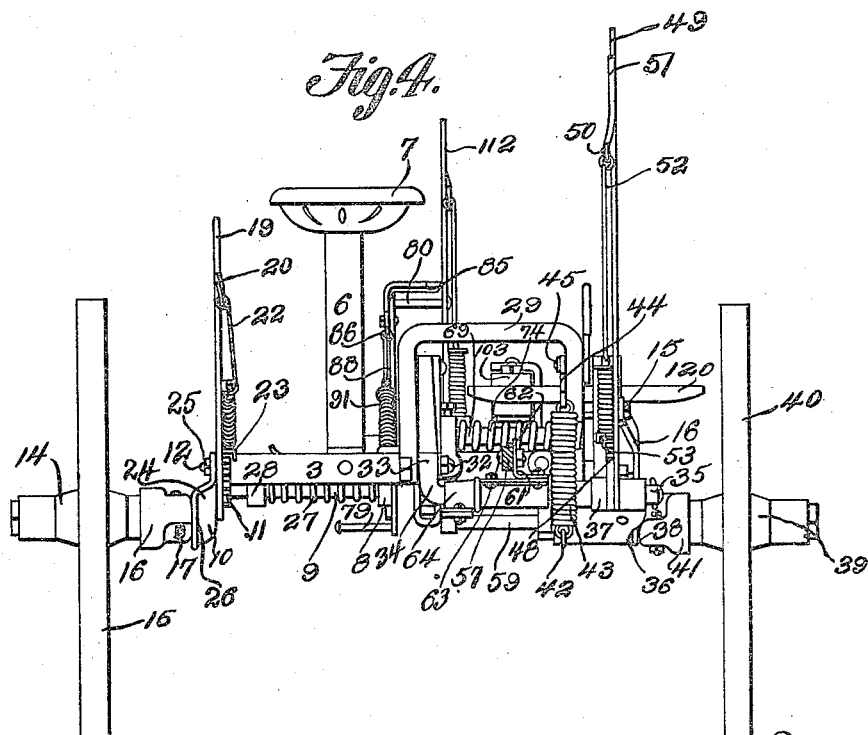
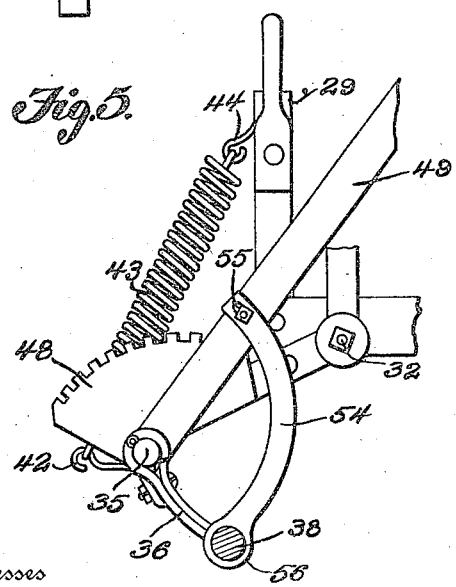
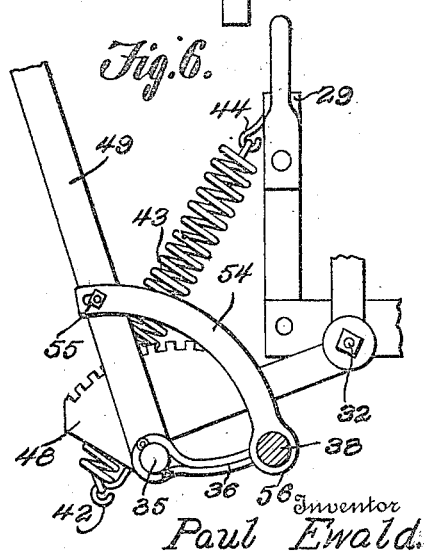

UNITED STATES PATENT OFFICE.

PAUL EWALD, OF CLINTONVILLE, WISCONSIN.

PLOW.

1,167,683.

Specification of Letters Patent.   Patented Jan. 11, 1916.

Application filed August 10, 1911.  Serial No. 643,280½.

*To all whom it may concern:*

Be it known that I, PAUL EWALD, a citizen of the United States, residing at Clintonville, in the county of Waupaca and State of Wisconsin, have invented certain new and useful Improvements in Plows, of which the following is a specification.

The present invention relates to an improved sulky plow and more particularly to a plow of this type which is specially applicable for use at different angles, that is in plowing rough and uneven ground.

An object of my invention is to provide a plow supporting mechanism which may be adjusted to conform with the irregularities of the surface upon which the plow journeys, consequently obviating the breakage of the plow beam or the blade such as the case may be.

Another object of my invention, resides in the provision of an efficient plow supporting and operating device, such as will allow the plow to be operated in the usual manner upon an irregular surface, means being also provided for adjusting the supporting wheels of the device in such a manner that when the same travels over the side of a hill the plow beam will be maintained in its usual substantially vertical position.

A further object of my invention is in the provision of means, whereby the plow may be raised or lowered into or out of contact with the ground, at certain times consequently obviating its breakage by contacting with such obstructions as stones or the like.

A still further object of my invention resides in means carried at each side of the device wherein its supporting wheels may be adjusted through the medium of a double crank leverage system to raise and lower the opposite sides of the device and at the same time allowing the plow blade to operate in its usual substantially vertical position.

A still further object of my invention resides in means for adjusting the draft attachment of the vehicle to conform with the adjustment of the body portion thereof; consequently obviating the usual position of the tongue when the vehicle is in an adjusted position.

With the above and other objects in view, my invention relates to such details of construction and in the arrangement and combination of parts as will hereinafter be fully described and specifically pointed out in the appended claims.

In describing my invention in detail, reference will be had to the accompanying drawings wherein like characters denote like or corresponding parts throughout the several views and in which:—

Figure 1, is a side elevation of my improved plow and supporting mechanism, Fig. 2, is a plan view thereof, Fig. 3, is a longitudinal sectional view of my improved plow, Fig. 4, is a rear elevation thereof, Fig. 5, is a fragmentary sectional view, illustrating the manner of raising and lowering one of the wheels, Fig. 6, is a view similar to Fig. 5, showing the parts in an operative position, and Fig. 7, is a detail view of the draft operating mechanism.

In the accompanying drawings wherein is illustrated the preferred form of my invention, the numeral 1 designates the body portion or supporting structure of my invention, which as is shown in the drawing is substantially U-shaped. A portion of this frame, is bent to form parallel extensions 2 which extensions provide an auxiliary supporting device for the draft operating mechanism above mentioned. For the purpose hereinafter set forth, the rear extremity of one of the ends of the body portion is bent at right angles thereto as shown at 3, and again at 4 to form a circular supporting device, the end of which is secured to the body portion by such means as shown at 5. As is readily obvious by reference to the drawing, I have mounted upon this last mentioned supporting structure, the lower extremity of a leaf spring 6, the upper extremity of which carries the ordinary operating seat 7.

Revolubly supported upon the body portion 1, through the medium of a bearing 8, is an axle 9, the latter being journaled through an extension 10 carried upon an ordinary segmental rack 11, the latter being fast upon the supporting structure 3, as shown at 12. Further the end of the axle 9 is bent as shown at 12' to form a crank 13. The latter serves as a suitable supporting stud which is received by the hub 14 of the wheel 15. For purpose of preventing the wheel from running off of the stud, and consequently injuring the operating parts of the device, I have provided a bearing 16, which is secured substantially thereto as shown at 17.

It is readily apparent that the movement of the axle will adjust the wheel or rather the body portion of the device to different angular positions, that is when the body portion is in the position shown in Fig. 4, the wheel is in its lowermost position in relation thereto. I have provided efficient means whereby the body portion may be lowered so that it is below the center of the wheel thus enabling the operator to adjust one wheel to its lowermost position while the center of the other wheel is above the center position, consequently allowing the device to run upon irregular ground without moving the blade of the plow from its usual substantially vertical position. With this in view, I have provided upon the axle 9, a pivot lever 19, the latter having a handle 20 pivoted thereon as shown at 21, for operating a vertically extending rod 22 carrying a pawl 23. The pawl 23 is, as is clearly shown in engagement with the teeth upon the rack 11, consequently holding the body portion at certain times in rigid relation with the axle and its attachment.

For the purpose of elevating and depressing the stud or crank 12', I have pivoted upon the lever 19, an arm 24 as shown at 25, the latter being also connected to the stud as shown at 26. Upon reference to Fig. 3, of the drawings, it will be recognized that the stud is shown in a lowered position in relation to the body portion however if the lever 19 is moved to a vertical position it will be recognized that the stud will be raised, consequently lowering the body portion in relation to the wheel.

For the purpose of more readily assuring the efficient operation of the crank, I have provided upon the axle 9, a coil spring 27, one end of which is fast upon the bearing 8, the other end being connected to an adjustable collar 28 as is clearly shown. Further I have provided a second substantially U-shaped bracket 29, the ends of which are secured to the first mentioned bracket as shown at 30 and 31. It will be recognized, that the bracket 29 connects the ends of the supporting bracket consequently greatly reinforcing the same and assuring the durability of the device.

Pivoted upon the body portion 1, as shown at 32, is a bell-crank lever 33 one end of the latter being bent at right angles as shown at 34 to form a supporting member 35. This supporting member 35, provides the main supporting structure for the second axle supporting the other wheel. With this in view I have provided upon the member 35, a depending bracket 36, the latter having connection therewith through the medium of a sleeve 37. The bracket 36 supports, as is clearly shown an axle 38, the latter being received into the hub 39 of the wheel 40. Here a bearing 41 is provided which is similar to the bearing 16, and it is thought that a detail description of its construction would be superfluous.

For normally holding the bracket 36 in a certain position, I have provided thereon a hook 42 which has engagement therewith one end of a coil spring 43, the other end of the latter being secured to a hook 44, carried upon the member 29, as shown at 45. A second bell-crank lever 46 is provided and pivoted upon the body portion 1, as shown at 47, one of its ends carrying a segmental rack 48 which is fast upon the supporting member 35. A lever, 49 is loosely mounted upon the supporting member 35 and has pivotally mounted thereon as shown at 50 a handle 51, the latter having connection with a depending rod 52 which carries a pawl 53 for engagement with the segmental rack 48. Further this lever is provided with a quadrantal shaped arm 54, the latter being secured thereto as shown at 55, its other end having engagement with the axle 38, as shown at 56. By this arrangement it will be recognized that as the lever 49 is rocked to different positions, the body portion of the device will be raised and lowered in relation to the wheel 40, thereby serving the purpose hereinbefore set forth.

From the foregoing it will now be appreciated that the operator, when at his post of duty upon the device, can easily manipulate the levers 49 and 19 to raise and lower the body portion at opposite sides, thereby providing a means, as above described for holding the plow in its usual substantially vertical position when the device is traveling over irregular ground.

A plow beam 57 is provided, the forward end of which is secured by any suitable means to a substantially U-shaped bracket 59, carried upon the forward end of the body portion 1, its rear end carrying a plow blade 60. Means have been provided for connection with the plow beam, intermediate its ends, whereby it may be raised and lowered according to the will of the operator. With this in view, I have provided upon the supporting member 35, a bracket 61 over which extends the plow beam, a member 62 being provided upon the bracket for engagement with the plow beam and such means as shown at 63. For the purpose of holding the bracket 61 in different positions, I have provided upon the supporting member 35 bearings 64, the construction of which is readily apparent.

The forward extremities of the bell-crank levers 46 and 33 respectively have pivotal connection as shown at 65 with pairs of normally downwardly projecting arms 66 and 67. Further bearings 68 are provided upon the frame work of the device over which is journaled a bar 69, one end of the latter being bent as shown at 70 to form a downwardly projecting finger for pivotal engagement with the arm 67 as shown at 71. An adjustable depending lug 72 is provided upon the bar 69, which has pivotal engagement with the arm 66, as shown at 73 whereby when the bar 69 is rotated, the bell-crank levers will be rocked simultaneously. For the purpose of holding the bar 69 in normal position, a coil spring 74 is provided thereon, one end of which is secured to one of the bearings 68 while its other end is fast to an adjustable collar 75 on the bar, the collar being held in a normally locked position in relation thereto through the medium of a set screw 76.

Upon reference to the drawings, it will be recognized that the bar 69 projects beyond one side of the supporting frame 1. Upon this projecting end is provided an angularly bent lever 77, the latter having engagement with the bar at an intermediate portion, and being held in rigid relation therewith through the medium of a bearing 78. Provided near the extremities of this lever are angularly projecting foot engaging members 79 and 80, the latter serving as means whereby the operator may manipulate the lever in an efficient manner.

It will now be recognized that when the lever is in the position shown in Fig. 3, the plow blade is held out of contact with the ground, as the supporting member 35 is in its uppermost position in relation to the body portion. However, it will be recognized that if the lever 77 is operated in such a manner as to rock the bell-crank levers 33 and 46 respectively, the plow may be lowered in relation to the ground. For normally holding the lever 77 in the position shown in Fig. 3, I have provided thereon a catch 81 pivoted as shown at 82, the catch having a tooth 83 for engagement with a projecting step 84. Means have now been provided for operating this catch so that the operator of the machine may lower the plow when it is desired. With this in view, I have provided upon the lever 77, a pivot foot pedal 85, the latter being secured thereto as shown at 86 and carrying a depending lug 87 for engagement with a downwardly projecting rod 88. Slidably mounted upon the lever 77 through the medium of a bearing 89 is a link 90, the latter being held normally in a downward position through the medium of a coil spring 91. This pawl has engagement with the catch 81 by such means as shown at 92 whereby when the foot pedal 85 is depressed the catch will be drawn out of engagement with the step 84. The operation of this part of the device is as follows: The device is in its normal position as shown at Fig. 3, the plow blade 60 being out of engagement with the ground. If it is desired to lower the blade however, the operator by use of his foot manipulates the foot pedal 85 consequently drawing the catch 81 out of engagement with the step 84. When this operation occurs, the upper end of the lever 77 is moved downwardly consequently manipulating the bell-crank levers 33 and 46 respectively so that the supporting member 35 is lowered, consequently lowering the plow beam and blade. While this operation does not materially effect the raising and lowering of the body, the body is slightly raised when the parts are in this position.

As set forth above, I have provided in connection with the plow efficient means for operating the draft attachment of the device to conform with the adjustment of the body portion in relation to the wheels. It will be readily seen that when one side of the body portion is materially higher than the other, the tongue of the vehicle would naturally be higher upon one horse than the other. To obviate this difficulty, and to provide means for adjusting the tongue so that it is in relatively the same position to each horse I have provided the following mechanism.

Having one end secured to the extension 2 of the body portion as shown at 93 is a transversely projecting bar 94, the latter being bent as shown at 95 to provide supporting means for a segmental rack 96, the latter being secured thereto as shown at 97. Further the end of the bar 94 is bent at right angles to the portion 95 and secured to body portion 1, as shown at 98 and continued to form the step 84.

A pair of tongue supporting members 99 and 100 are provided, upon the extension 2 and secured thereto as shown at 101. The upper ends of the supporting members 99 and 100 are spaced apart from each other and have journaled transversely therethrough a pin 102. The pin 102 as is shown pivotally supports a tongue 103 which as is obvious is of the ordinary form.

For the purpose of connection with one end of a substantially bell-crank lever 104 pivoted upon the extensions 2 as shown at 105, I have provided the tongue 103 with slidably projecting fingers 106, the latter having connection with the tongue 103 as shown at 107 and to the bell-crank lever as shown at 108. The other end of the bell-crank lever has pivoted thereto as shown at 109 an arm 110.

For the purpose of operating the arm 110, and consequently moving the tongue laterally, I have pivoted upon the segment 96, as shown at 111, an operating lever 112, the latter having a handle 113 pivoted thereon for engagement with a downwardly projecting rod 114, the latter having connection with a pawl 115 which is slidably mounted in a bracket 116, as is clearly shown. For the purpose of normally holding the pawl 115 in engagement with the teeth, I have provided a coil spring 117 which has one end secured to the bracket 116, its other end being secured as shown at 118. The arm 110 having connection with the operating lever assures the positive operation of the tongue during the movement of the lever 112 consequently greatly adding to the efficiency of the device.

Provided upon the extensions 102, and supported by a lug 119 is a curved arm 120, the latter coöperating with a slot in the end of the tongue whereby the latter is guided in its transverse movement upon the device.

The greatest of stress is laid upon the simplicity and efficiency of the draft adjusting mechanism, inasmuch as its particular use in connection with the device more readily assures the positive operation of the latter.

Such changes as are permissible by the subjoined claims may be resorted to, if occasion require, without departing from the spirit and scope of my invention.

Having thus fully described my invention, what I claim as new and desire to secure by Letters Patent is:—

1. In a device of the character described, a body portion, an axle carried by said body portion, a part of said axle bent to form a crank, a wheel carried upon said crank, means carried by said axle and having engagement with said crank whereby said body portion may be raised and lowered in relation thereto, a second axle, a bracket carried upon said axle, a means for supporting said bracket, a bell crank lever pivoted upon said body portion and having connection with the bracket supporting means, a means carried by the bracket supporting means and having engagement with said second mentioned axle whereby said body portion may be adjusted in relation to said bracket supporting means and means for operating said bell crank lever.

2. In a device of the character described, a body portion, a pair of wheels supporting the same, a means for raising and lowering said body portion, a bar journaled over said body portion and terminating at one end in a finger, a coil spring mounted upon said bar as a means for holding the same in normal position, an arm secured to said bar, a plurality of bell crank levers pivotally mounted upon said body portion, a plurality of arms pivotally connecting one of said bell crank levers with the said finger, a plurality of arms connecting another of said bell crank levers with the first mentioned arm and the last mentioned bell crank lever terminating in a supporting means for one of said wheels, an adjustable bracket mounted upon said supporting means for the reception of a plow beam, a U shaped bracket extending downwardly from the forward end of said body portion for the reception of one end of the plow beam, a plow blade secured to the other end of said plow beam and a lever secured to the other end of said bar as a means for raising and lowering the plow beam as and for the purpose set forth and described.

In testimony whereof I affix my signature in presence of two witnesses.

PAUL EWALD.

Witnesses:
 WM. SPLITTGERBER,
 R. G. GIBSON.

Copies of this patent may be obtained for five cents each, by addressing the "Commissioner of Patents, Washington, D. C."